US007016891B2

(12) United States Patent
Powers, III

(10) Patent No.: US 7,016,891 B2
(45) Date of Patent: *Mar. 21, 2006

(54) SYSTEM AND METHOD FOR PERFORMING CONTEXT CHECKS

(75) Inventor: John Richard Powers, III, Monte Sereno, CA (US)

(73) Assignee: Apple Computer, Inc., Cupertino, CA (US)

( * ) Notice: Subject to any disclaimer, the term of this patent is extended or adjusted under 35 U.S.C. 154(b) by 434 days.

This patent is subject to a terminal disclaimer.

(21) Appl. No.: 10/185,857

(22) Filed: Jun. 26, 2002

(65) Prior Publication Data

US 2002/0194252 A1 Dec. 19, 2002

Related U.S. Application Data

(63) Continuation of application No. 08/239,138, filed on May 6, 1994, now Pat. No. 6,453,311.

(51) Int. Cl.
*G06F 17/30* (2006.01)
(52) U.S. Cl. .................. 707/2; 707/7; 707/9; 718/108; 719/318
(58) Field of Classification Search ............. 707/1–10, 707/100–104.1, 200–206; 719/318; 710/65, 710/263; 718/107, 108
See application file for complete search history.

(56) References Cited

U.S. PATENT DOCUMENTS 5,291,608 A * 3/1994 Flurry ......................... 710/263
5,367,680 A * 11/1994 Flurry et al. ................. 718/107
5,455,958 A * 10/1995 Flurry et al. .................. 710/65

OTHER PUBLICATIONS

Nye, Xlib Programming Manual, O'Reilly & Assoc., Mar. 1993.*
Quercia et al, X Window System User's Guide, O'Reilly & Assoc., Jan. 1991.*
Adrian Nye, Xlib Programming Manual, O'Reilly and Assoc., pp. 449-452, Mar. 1993.*

* cited by examiner

*Primary Examiner*—Majid Banankhah
(74) *Attorney, Agent, or Firm*—Blakely, Sokoloff, Taylor & Zafman LLP

(57) ABSTRACT

A system and method is described which provides for context checking of an operating environment. A context manager controls the execution of context checks requested by applications or processes. In one embodiment, the context check modules are defined as self-contained modules located in a database. When the data base is opened, these modules are loaded and registered with the context manager. Upon occurrence of certain user actions, the context manager will issue an event to cause the appropriate modules to perform a context check of certain context of the environment. The resulting context information is stored in memory by the context manager and provided to the applications by the context manager when needed. One advantage is that the context checks performed can be changed simply by adding or deleting modules from the database. In other embodiments, context checking functions can also be provided by providing context files, which are loaded at initiation of the context manager and are independent of the database utilized, and by providing certain highly repeatable functions within the function of the context manager itself.

71 Claims, 12 Drawing Sheets

\<Define Context Check\> "IsWindowShowing", "ISWS", "MoG1", PSTRING
\<If\> IsWindowShowing("myOptionalData")

*Figure 3b*

| Parameter | Description | Required or Optional |
|---|---|---|
| MoG1 | Identification of target application. The context manager has access to the target application's global variables. | The creator of some target application must be provided. The delivery engine or any executing application can be used. |
| ISWS | Unique 4-character external module ID | Unique 4-character module ID must be provided. This is the name of the 'extm' resource. |
| PSTRING | The data associated with the 'ctxt' key will be a string. | A variety of data types are supported as context check parameters. PSTRING is one of them. |

*Figure 3c*

```
//-------------------------------------------------------------
//Entrypoint
//We are passed a byte stream.
//The stream has no length byte or terminator. Length is in inSize.
//
//msg is the incoming array of bytes.
//inSize is the size of msg in bytes.
//outMessage is an outgoing array of bytes.
//outSize is the size of outMessage in bytes.
//
pascal OSErr
main(char* msg,
        Size inSize,
        void* outMessage,
        Size* outSize,
        Handle /*notUsed*/);
{
        short result=fase;
        OSErrr   err = noErr;

if(inSize>0)
        {
                //We have incoming data,
                //do something useful with it.
                result = true;
        }
        //Return a pointer to the result.
        Ptr p=NewPtr(sizeof)short));
        if(p)
        {
                //Pointer is okay, we can return the reuslt.
                *p=result;
                *outMessage = p;
                *outSize = sizeof(short);
        }
        else
        {
                //No pointer, cannot return a result.
                *outMessage=nil;
                *outSize=0;
        }
        return(err);
}
```

*Figure 3e*

SYSTEM AND METHOD FOR PERFORMING CONTEXT CHECKS

This application is a continuation application of U.S. patent application Ser. No. 08/239,138, filed May 6, 1994 now U.S. Pat. No. 6,453,311.

BACKGROUND OF THE INVENTION

1. Field of the Invention

The present invention relates to the performance of context checks during execution of processes. In particular, the present invention relates to a system and method for evaluating a user's context, wherein the context checks performed can be modified without affecting the application that uses the context check results.

2. Art Background

As the use of computer systems have become more widespread, the need to provide application software that is flexible to operate on a variety of systems and within different computing environments has increased. Typically it is the responsibility of the software application to determine the operating environment in order to execute properly without the user providing details regarding the system or the operating environment.

The environment or context of the environment dictates certain functions, such as, for example, whether the display is color or monochrome, the resolution of the display, the operating system executing and features of the operating system such as the memory configuration and the like. It is readily apparent that the need for performing context checks in an automated manner applies to a variety of applications, such as the user interface of the system.

In order for applications to be adaptable to a variety of computers or configurations of computers, it is necessary to perform context checks during execution of these applications. As is done in the prior art, however, the application includes code to perform the necessary context checks and then executes functions in accordance with the results of those context checks. However, if the operating environment changes and additional or different context checks are required, the author of the code must revise the code in order to accommodate those changes. This can be quite cumbersome and inefficient.

SUMMARY OF THE INVENTION

A system and method for performing context checks of system and user environment is disclosed. The context checking mechanism is a general purpose mechanism for performing context checks of the computing environment. Context modules are maintained and loaded into the context mechanism referred to as the context manager. The context manager registers these context modules and through execution of the modules performs context checks when needed or determined by the occurrence of a specific user action, such as movement of the mouse or the like. Memory is allocated to hold results of context checks and these context check results are stored in memory until requested by an application or process. The context manager then provides the results to the application. As the number of modules that is associated with any application is virtually limitless, a variety of context checks can be performed and easily modified without modification of the actual application or operating environment. This feature is particularly beneficial for adapting to upgraded or new environments as they are created.

BRIEF DESCRIPTION OF THE DRAWINGS

FIG. 3b is an example of an event,

FIG. 3c describes the parameters of the event,

FIG. 3d illustrates the process flow of the event from definition to execution and FIG. 3e is an exemplary listing of a shell of an external context module.

DETAILED DESCRIPTION OF THE INVENTION

Figure 1:
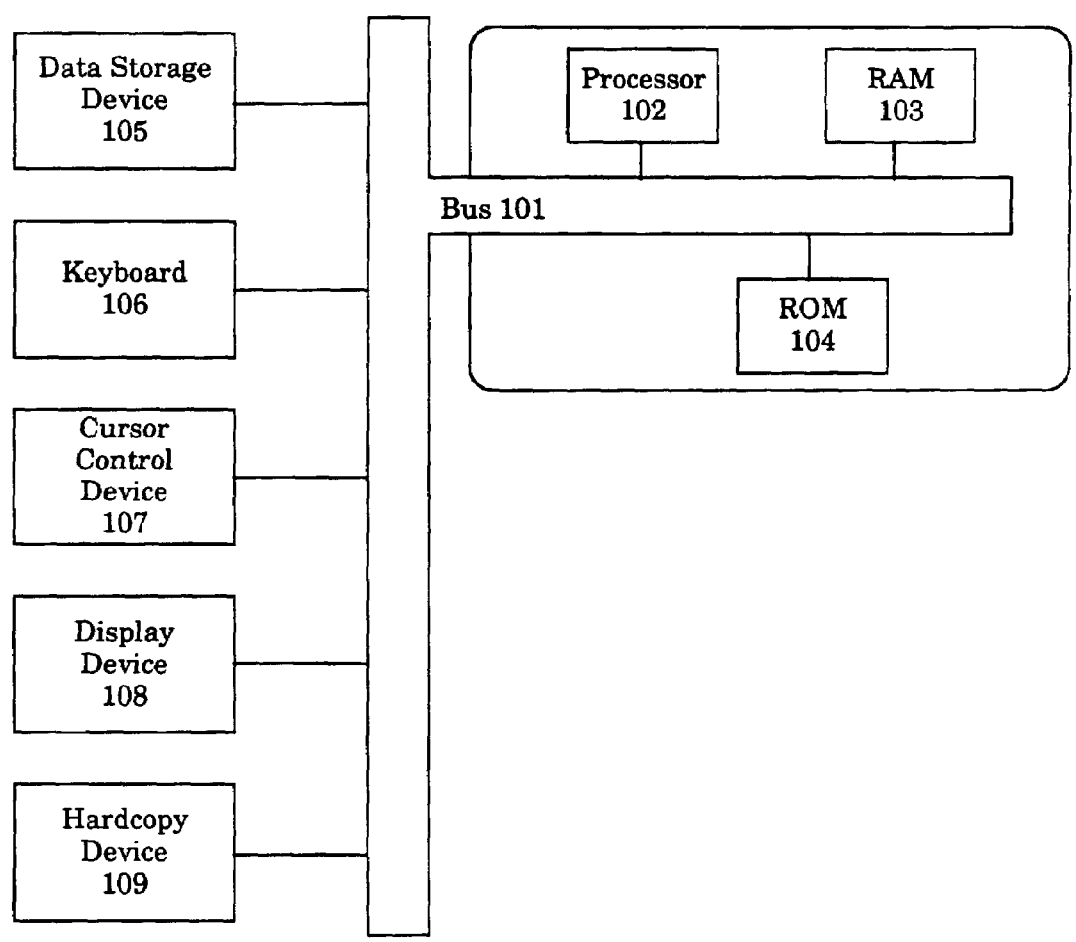
FIG. 1 is a block diagram illustrating the components of a computer system as may be utilized in one embodiment of the present invention.

A system and method for performing a check of context, for example, the user context, in a computer system is described. In the following description, numerous specific details are set forth, such as coding examples, in order to provide a thorough understanding of the present invention. It will be apparent, however, to one skilled in the art that the present invention may be practiced without these specific details. In other instances, well-known circuits for performing certain of the functions have not been shown in detail in order not to unnecessarily obscure the present invention.

A computer system of one embodiment is described with reference to FIG. 1. The present invention is preferably implemented on a general purpose micro-computer, such as one of the members of the Apple® Macintosh® family of computers.

The computer system as may be utilized generally comprises a bus or other communications means 101 for communicating information, a processing means 102, coupled to the bus 101, for processing information, and a random-access-memory (RAM) or other storage device 103 (commonly referred to as main memory), coupled to the bus 101 for storing information and instructions for the processor 102. In addition, a read-only-memory (ROM) or other static storage device 104 is coupled to the bus 101, for storing static information and instructions for the processor 102. A data storage device 105, such as a magnetic disk and disk drive, is coupled to the bus 101 for storing information and instructions. An alpha-numeric input device 106, including alpha-numeric and other keys, is coupled to the bus 101 for communicating information and command selections to the processor 102. A cursor control device 107, such as a mouse, trackball, cursor control keys, etc., is coupled to the bus 101 for communicating information and command selections to the processor 102, and for controlling cursor movement.

Furthermore, a display device 108 is coupled to the bus 101 for displaying textural, graphical or video output. Additionally, it is useful if the system includes a hardcopy device 109, such as a printer, for providing permanent copies of information. The hard copy device 109 is coupled to the processor 102 through the bus 101. The computer system of FIG. 1 may also include other devices, for example, a means for processing and replaying audio-data as well s other types of input/output devices (not illustrated).

The computer system illustrated in FIG. 1 is one that generally provides a window-based graphical user interface which is well-known (for example the Apple® Macintosh® family of computers, available from Apple Computer, Inc., Cupertino, Calif.) and is not described in detail herein. In operation, the window-based user interface in the present embodiment is generated and displayed using software stored in the RAM 103 or ROM 104 and executed by the processor 102, as is well-known in the art.

As will become apparent in the description below, various computer elements provide the functionality described. For example, a window is displayed on the display device 108 and the processor 102 provides processing resources for the delivery engine and context manager. A generated data base, described herein, is stored in the data storage 105 and loaded into the RAM 103 as needed during the execution of the delivery engine. In the present embodiment, the context manager is implemented as part of the delivery engine for providing context-specific information during execution of elements extracted from the data base by the delivery engine. However, it will be apparent from the description below that the context manager's features and attributes have application in a wide variety of areas. Furthermore, the context manager can be implemented as an independent processing entity or as part of another component, such as the operating system. Accordingly, the present invention is not limited by the following detailed description of this embodiment and it is understood to those skilled in the art that the present invention may be embodied in a variety of configurations in a variety of computer systems.

A brief description of the delivery engine will now be described. For more detailed information regarding the delivery engine, see U.S. application Ser. No. 08/059,542, filed May 10, 1993, entitled "An Interactive Multi-media Delivery Engine", which is assigned to the common assignee Apple Computer, Inc. The delivery engine provides for the presentation of information using a variety of media.

Figure 2:
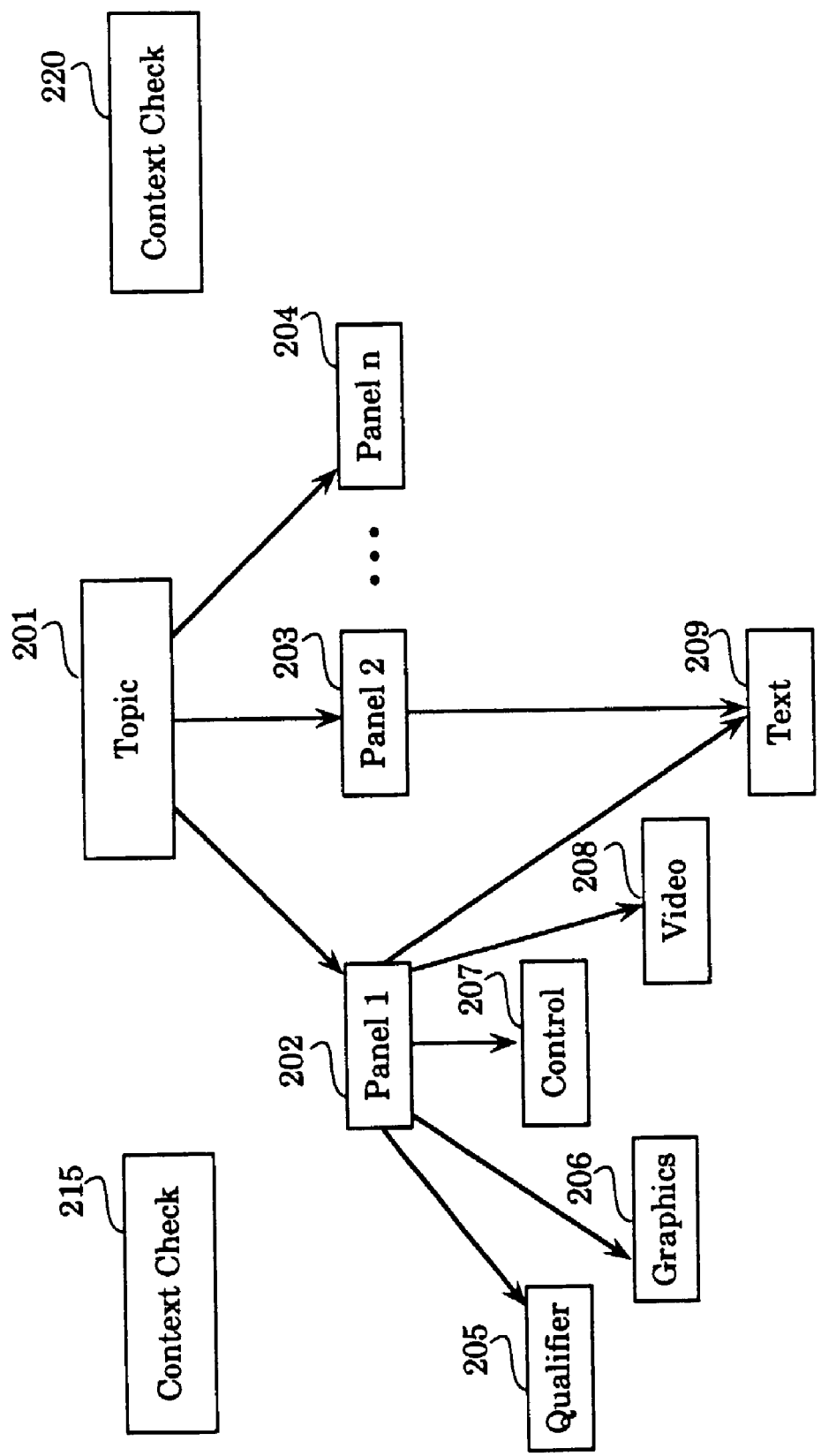
FIG. 2 is a block diagram illustration of the database elements employed in one embodiment of the present invention.

In the present embodiment, the delivery engine provides a help system to supply user instruction. Referring to FIG. 2, the user instruction is organized as a series of topics. Each topic 201 contains general information and a reference to panels 202, 203, 204 which are displayed to the user. Each panel contains references to visual media 206 as well as control 207 and qualifier 205 objects. The topics 201, panels 202, 203, 204, media 206, controls 207 and qualifiers 205 are all encapsulated as individual entities in a data base. The delivery engine operates responsive to current and prior operator input to retrieve objects from the data base indicative of the next data to be displayed.

As noted above, the data base contains a plurality of objects. For example, a topic points to a series of panel objects, and each panel object may be linked to a qualifier object, graphic data object, control object, video-data object, or text-data object, causing the corresponding information to be displayed when the object is instantiated or executed. In the currently preferred embodiment, the C++ programming language is used because of its inherent capability to support object-oriented programming. However, it would be apparent to one skilled in the art to use alternative programming languages such as ADA or Modula-2, which would not cause departure from the spirit and scope of the present invention.

Below is an example of a panel definition:

```
<Define Panel> "Menus"
    MoGuide menus are:*
    File
    Edit
    MoGuide
    Window
    Click the right arrow to continue.
<End Panel>
```

Figure 3A:
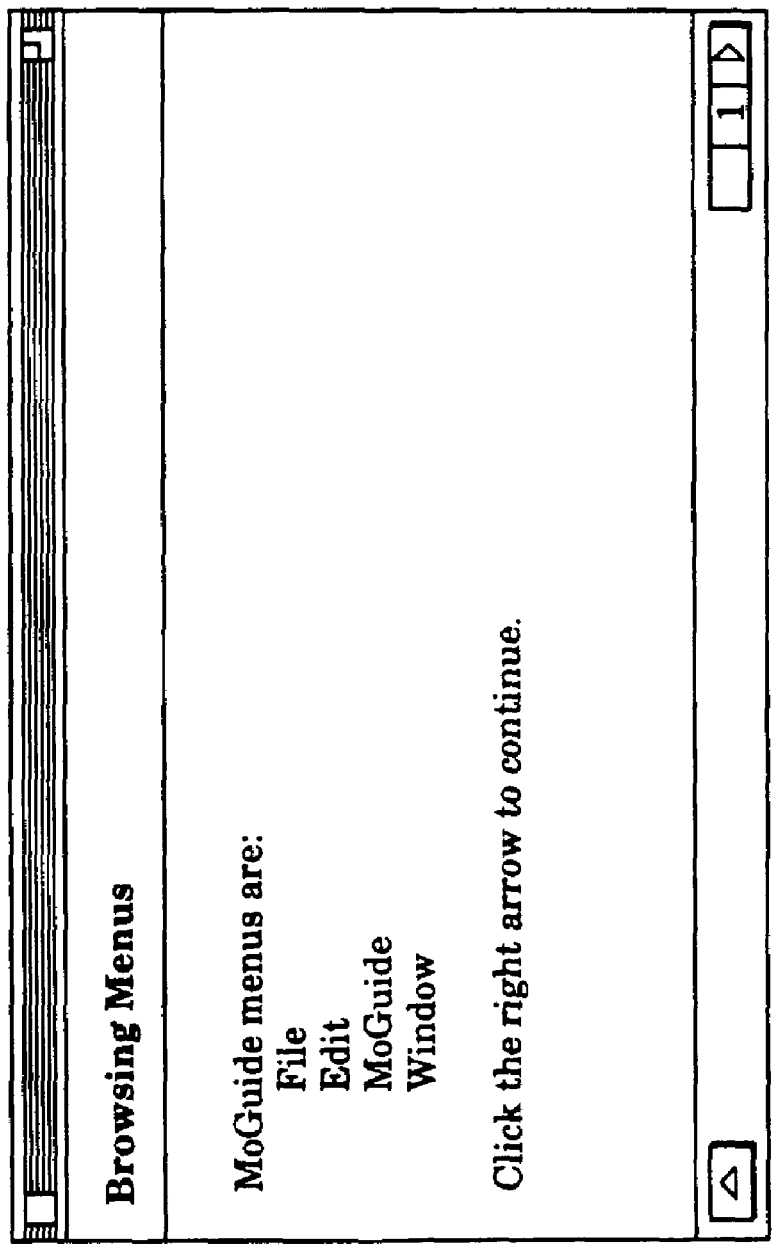
FIG. 3a is illustrative of a panel display.

The elements, <Define Panel> and <End Panel> are commands. The text between the commands are data that is displayed in the presentation window. FIG. 3a shows what the panel looks like when it is displayed.

Preferably, each object in the data base is defined as a Macintosh® resource. A Macintosh® resource is code or data that may be used by various applications. Macintosh® resources are described in the publication entitled "Inside Macintosh Volume 1" by Apple Computer, Inc. (Addison, Wesley Publishing Company Inc.).

During the operation of the delivery engine, elements are used typically when they are needed. Thus for example, a topic is retrieved from the data base and instantiated as an object. The topic object contains general topic information in a list of panels associated with the topic. Each panel that is linked to a topic is then retrieved from the data base and also instantiated as an object. Each retrieved panel similarly contains a list of panel objects and each panel object is also retrieved from the data base and instantiated as an object.

Furthermore, each qualifier linked to a panel is retrieved and instantiated as an object. Once all panels and panel objects have been retrieved and instantiated, the delivery engine begins an execution sequence with a first panel identified by qualifiers that indicate that the panel can be shown or has no qualifiers. Below is an example of a simplified presentation sequence of a topic with no qualifiers, for a series of panels.

```
<Define Sequence>        "Browsing Menus"
    <Panel>              "Menus"
    <Panel>              "Menus - File"
    <Panel>              "Menus - Edit"
    <Panel>              "Menus - MoGuide"
    <Panel>              "Menus - Window"
<End Sequence>
```

The panel object contents, for example, the text, graphics and video-data that are to be displayed on the panel, are retrieved. Once the panel contents are retrieved they are displayed on the panel display area of the presentation window. Subsequent panels are displaced in accordance with options provided to the user and the qualifiers associated with each panel. Therefore, the delivery engine, in conjunction with the data base objects, perform the same function as what most recognize as an application program.

In accordance with the teachings of the present invention, also included in the resources available in the database are context modules 215, 220. One or more context modules may be included in a single file. Each context module is a resource object which, when evaluated or executed, provides specified information regarding the user's context. For example, a module may provide a true or false value as the result of the check of a specific element of the user's context. Examples of context checks perform include a window that is "up front", an application that is executing at the time, as well as context checks regarding the system configuration, such as, whether the display is color or monochrome or if audio is available. It is readily apparent that the context modules need not be part of a type of structure typically identified as a database, but also can simply be files identified as context modules by the context manager and located in memory or data storage.

Previously, context checking operations were designed into the code of the application executing, for example, the delivery engine. As computer systems change, the type of context checks required change. In such a case, the application is updated to modify the context checks to be performed. The present invention is flexible to extend the context checking performed to accommodate present as well as future user context that may be needed. Thus, for example, as newer generations of computing environments are created, the delivery engine does not have to be changed. Rather, the data base is simply updated by adding and deleting context check modules. Preferably the context modules are identified to be of the type "external" such that the modules are loaded at the time the database is opened. In the present embodiment, external modules are stand-alone resources.

An object, referred to herein as TUserContext, is loaded into the delivery engine. This object, TUserContext, is instantiated when the data base is opened. The TUserContext object is a module of C++ code and performs the functions of the context manager to provide the instructions to perform context checking in accordance with the teachings of the present invention. However, it is readily apparent that the TUserContext Module can be realized as other types of code, which when executed, performs the functions discussed herein.

The TUserContext Module, once instantiated, searches the data base for external modules and installs each external module. In order to ease the communications between each context module and TUserContext, an Apple® event handler is installed for each module and communications are achieved through Apple events. Memory is also allocated to hold the results of the context checks performed by the modules. Thus, when a user action or other trigger, such as a time out function, occurs and a context check is to be performed, the handler for particular context module is retrieved and the context module code is executed. The result of the execution of the context module code is then stored in the internal memory. When the result of the context check is required, whether immediate or at a later time, the information is readily available and provided by TUserContext. In the present embodiment, a context check is performed by generating an Apple event to communicate a request for updated context information to the appropriate context module and storing the result of the context check received in response into memory. The context manager subsequently provides context information to a requesting application or process by reading the appropriate information stored in memory and communicating that information to the requesting application in process.

Figure 3D:
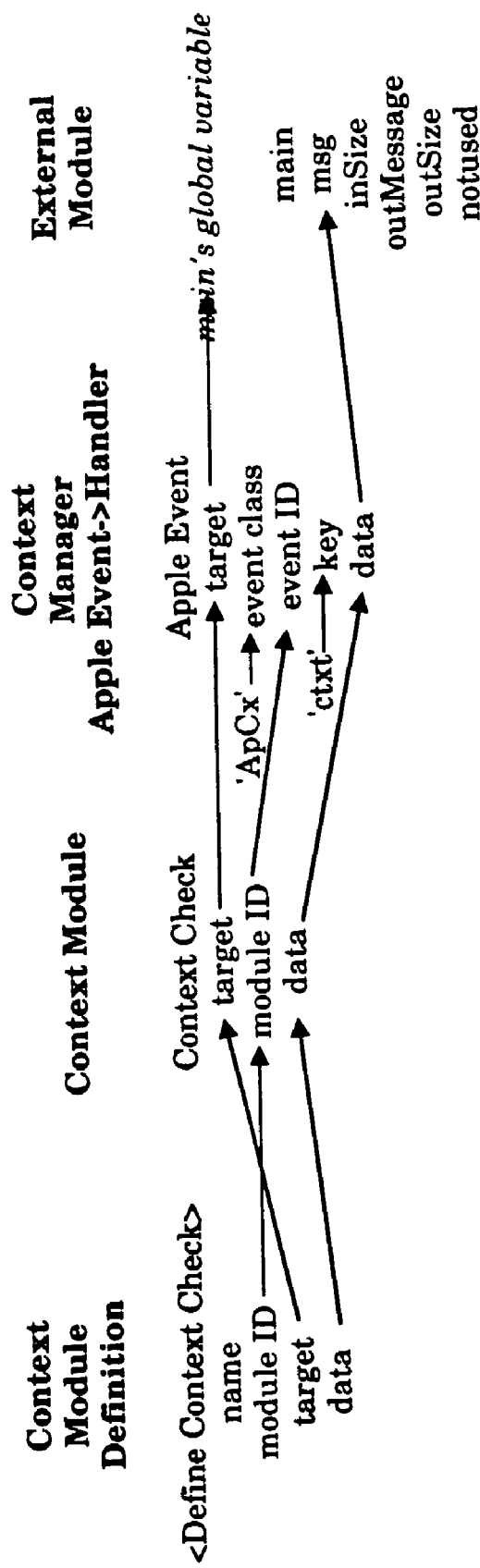

FIG. 3b is an example of an event identified as ISWS and FIG. 3c describes the parameters of the event. In this example, the event is issued to the appropriate external context module when the window is displayed. A button action or lapse of a predetermined amount of time can also be defined to send an event. FIG. 3d illustrates the flow of the event from definite on to execution.

In this example, the string "myOptionalData" is passed to the "msg" parameter as a pointer to a stream of bytes with no length byte or null terminator. The "inSize" parameter provides the length of the byte stream. In this illustration, a mixture of various data types including shorts, longs, and strings, can be passed. The data types are concatenated in the "msg" byte array with the strings word-aligned.

External modules are stand-alone code resources whose segment/resource name is a unique 4-character ID and resource type is "extm". Below is an example of an external module entry point.

pascal OSErr
main (char* msg,
Size inSize,
void* outMessage,
Size* outSize,
Handle/*notUsed*/);

The following external module parameters for a context check may be used:

| Parameter | Description | Example |
|---|---|---|
| msg | The context check function parameter in the context manager file. | "myOptionalData" |
| inSize | Length of the msg data in bytes. | 14 |
| outMessage | Return a pointer to a short. The short contains 1 for true, 0 for false. | 1 |
| outSize | Return the length of the outMessage data in bytes, 2 for short. | 2 |
| notUsed | (not used) | (not used) |

More particularly, the following parameters are preferably passed to a context module when an event is generated:

| Parameter | Description | Example |
|---|---|---|
| msg | The optional data in the <Define Event> | "myOptionalData" |
| inSize | Length of the msg data in bytes. | 14 |
| outMessage | (not used) | nil |

FIG. 3e is an exemplary listing of an external context module which is a shell for a context module. The shell provides a framework for adding the specific instructions to perform a context check. This shell is used to "author" or create the instructions of the context module. An authoring mechanism, for example, a compiler, is used to compile the instructions into a code that can be executed. The shell code can be modified to include the desired context function by replacing the default line of code "result=true" with the function that tests a specified state or context of the system. For example, if the context check is to determine if a modal dialog window is displayed, the following instruction would be added:

If (GetFrontModalWindowClass ( ) !=0) result=true;

The function, GetFrontModalWindowClass ( ) is a function provided in the Macintosh® operating system toolbox library.

Figure 4:
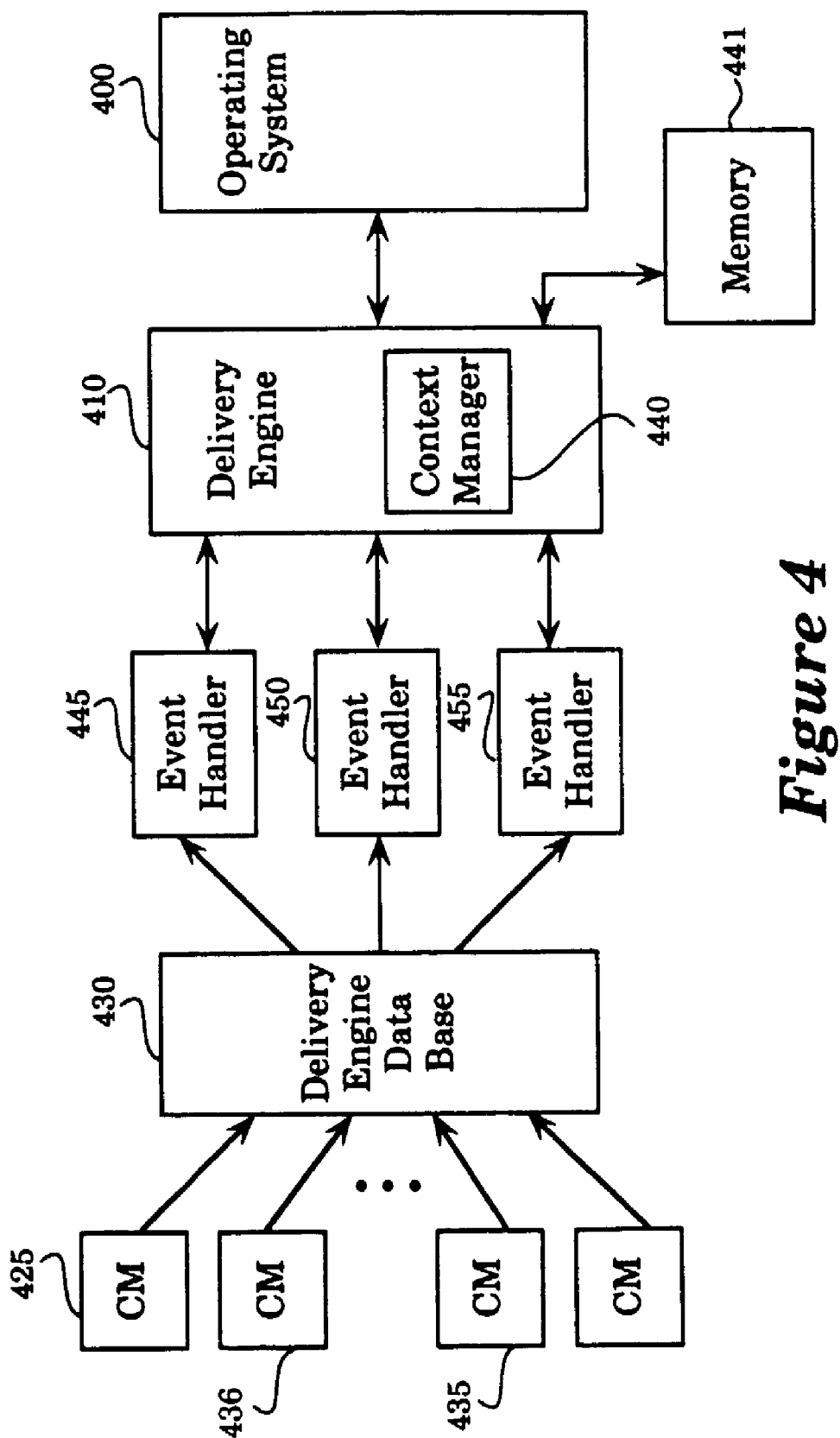
FIG. 4 is a simplified block diagram illustrating the system of one embodiment of the present invention.

A simplified block diagram illustrating the system and method of the present invention is shown in FIG. 4. The operating system of the computing environment 400 is coupled to the delivery engine 410 which is coupled to the delivery engine data base 410. The data base consists of a plurality of objects or modules 425, 435, 436. Among these objects are external modules containing context modules which have been provided in accordance with the teachings of the present invention. The delivery engine includes the context manager 440 which controls and manages the external context modules that are used to perform the context checks and stores the results of the context checks performed in the memory 441. As noted earlier, each external module has an associated event handler 445, 450, 455 which provides the communication ability between the external module and the context manager through Apple® events. Apple® events are described in detail in "Inside Macintosh, Interapplication Communication" by Apple Computer, Inc. (Addison Wesley 1993), and, as are well-known in the art, need not be further discussed herein.

Figure 5:
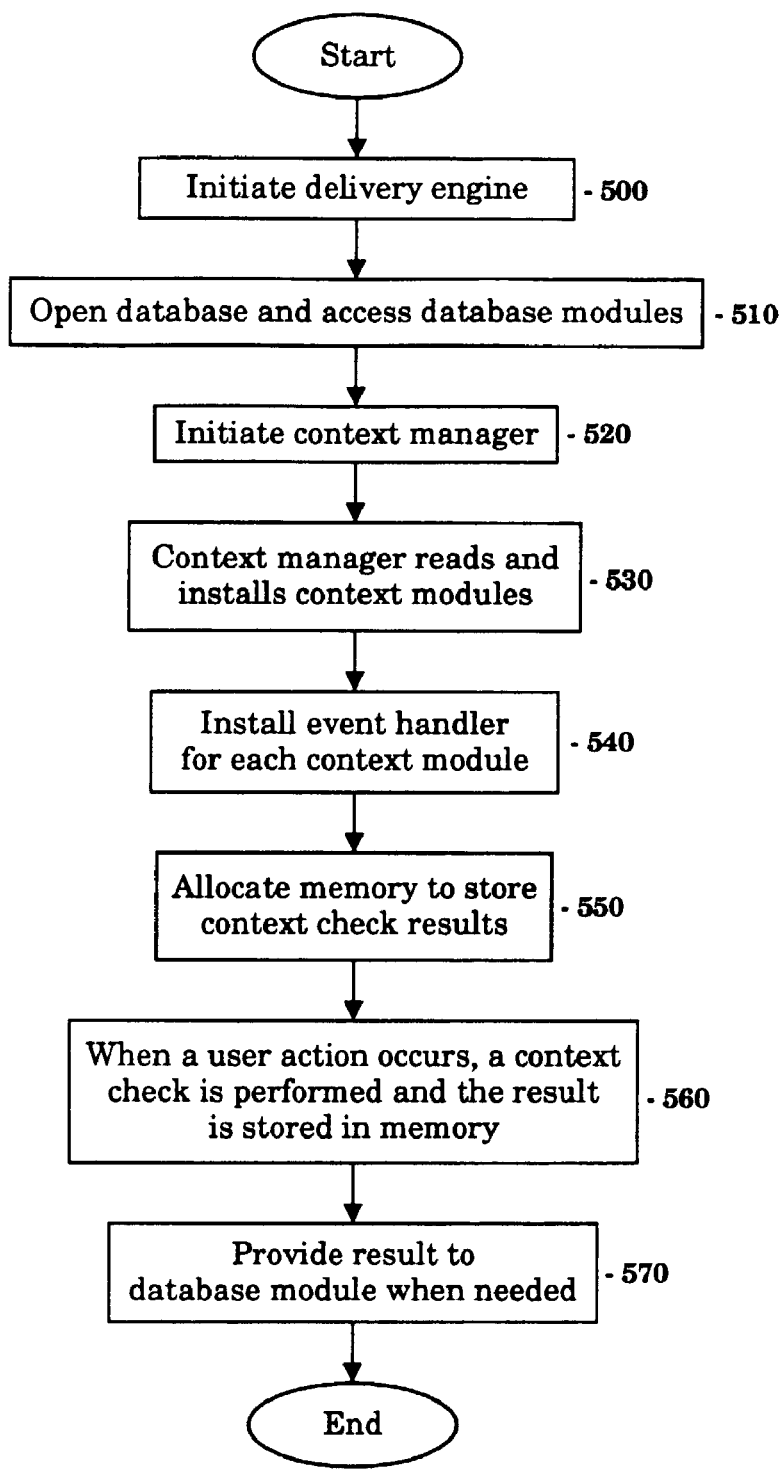
FIG. 5 is a flow diagram illustrating the process steps used to perform context checking in accordance with the teachings of the present invention.

The process is generally described with reference to FIG. 5. At step 500, the delivery engine is initiated. The data base is opened to retrieve the appropriate data modules or objects to be utilized by the delivery engine, step 510. The context manager is instantiated or initiated at step 520. The context manager reads and installs the external context modules, step 530. At step 540, an event handler is installed for each context module, in order to provide the ease of communication between the context manager and the context module. Internal memory, step 550, is then allocated to store context check results. Thus, at step 560, when a user action occurs, a context check is performed and the results are stored in memory. At step 570, the result of the context check is provided to a requesting application or process when needed.

Figure 6:
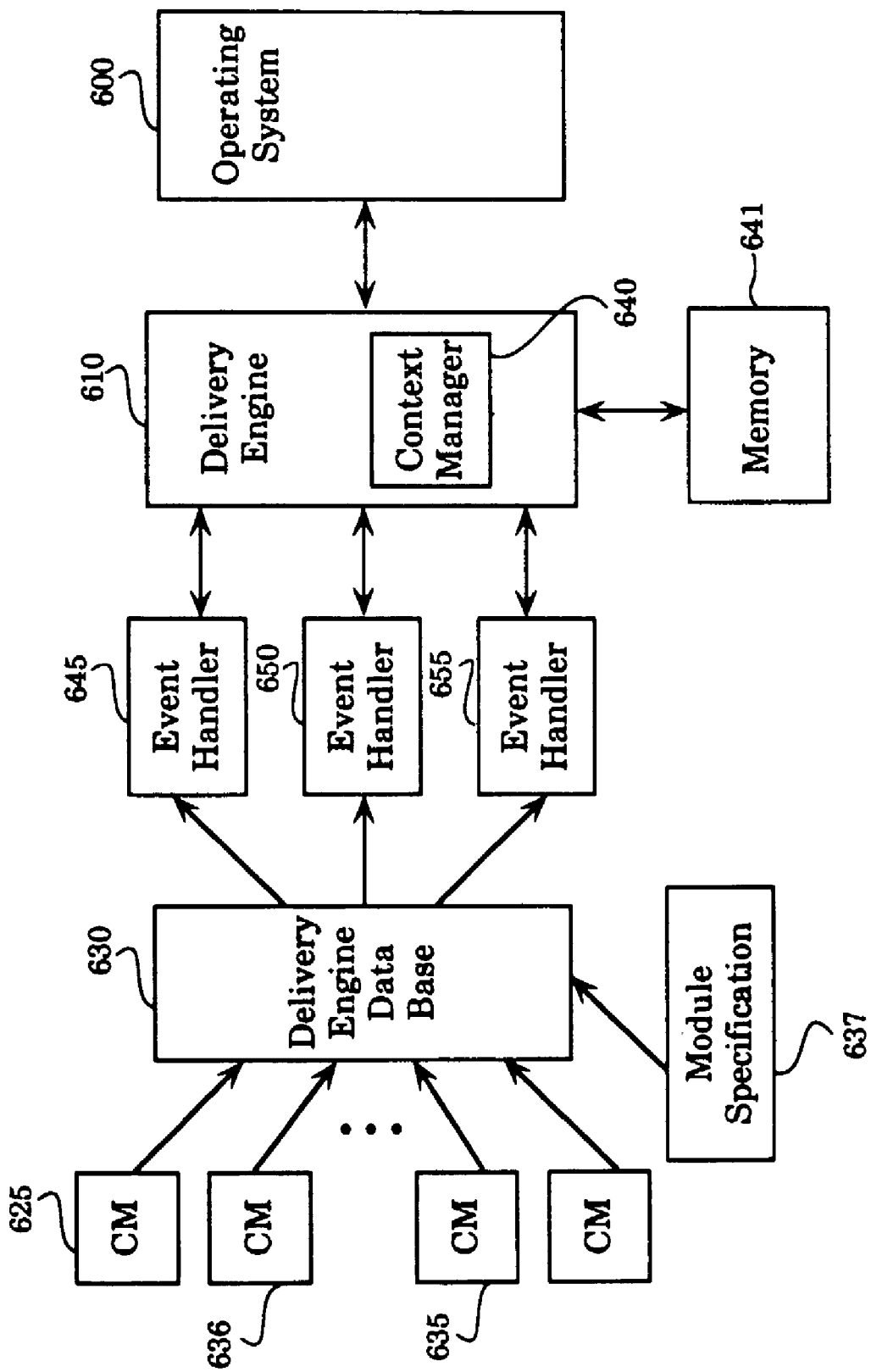
FIG. 6 is a block diagram of the components employed in an alternate embodiment of the present invention.

An alternate embodiment of the present invention is shown in FIG. 6. In addition to the operating system 600, delivery engine 610, context manager 640, event handlers 645, 650, 652, 655, delivery engine data base 620 and modules 625, 630, 635, a module specification is provided, preferably as a module in the data base, to enable ease of identification and extensibility of the context checking function. This capability also enables modules from different data bases to access one another. For example, a qualifier from a topic originating from a first database can request context information that is generated by a module located from a second data base. The module specification 637 provides information and data regarding the context modules and is reference by the context manager to access context modules.

In the present embodiment, a context module specification is provided for each context check. Preferably, the context module specifications are located in a data structure or linked list which is created and maintained by the author of the context modules. Each context module specification is identified by a context check identification such as a context check number. This context check identification is supplied by an application requesting certain context information (i.e., results) and is used by the context manager to retrieve the specification for a particular context check. For each context check identified, the specification identifies the context module to perform the context check and parameter information which is used by the context module to perform the context check. The context specification enables a single context module to perform more than the context check, dependent upon the parameter information passed to the context module. In addition, it is preferred that the context specification identify the target application within which the context check is performed. This feature is advantageous in a multi-processing environment.

The context manager therefore receives a notification to perform a context check as identified by a context check identification. The context manager retrieves the context specification associated with the context check identification to identify the context module to execute to perform the context check, preferably by a module identification (module ID), and the parameters to be passed to the context module to perform the specific context check function. An event is then issued for the identified module and the handler for the process responds to execute the context module. When a process subsequently requests context information, it does so by identifying the context by the context number. The context manager retrieves the results of the corresponding context check performed from memory and provides the results to the requesting process.

In the present embodiment, the context manager provides context information to the delivery engine. However, it is readily apparent that one or more other processes executing on the system can request context information from the context manager. Furthermore, in the present embodiment, upon occurrence of certain user events, the delivery engine notifies the context manager to perform certain context checks. It is also readily apparent that other processes, including device handlers or other portions of the operating system, can notify the context manager of a context check to be performed. The results of a context check performed by a context module are stored in memory identified by the module ID. Thus, the context manager performs a look-up using the module ID to retrieve the context check information. Preferably state information is also stored with each context check result. The state information may include information as to whether the data is locked or whether an error occurred during the last context check performed.

The system is flexible to permit other objects besides the external context modules to provide context check information. Preferably, a registered module list is generated and maintained by the context manager. The registered module list is preferably a linked list identifying each module loaded by its module ID and a pointer to the module ID of the next context module registered with the context manager. Using the registered module list, other objects, such as files, system code extensions or other applications can be used to provide context information Furthermore, as will be described below, the registered module list enables the context manager to override prior registered modules.

Preferably each entry in the registered module list includes an identification of the context module (module ID), the address of the module in memory, the address of the module the present module is overriding (if any), global or persistent data allocated that the module can reference or modify, and a pointer to the next entry in the list. The global data is preferably allocated and initialized when the delivery engine is initialized and is referenced and/or modified by the context module.

Figure 7:
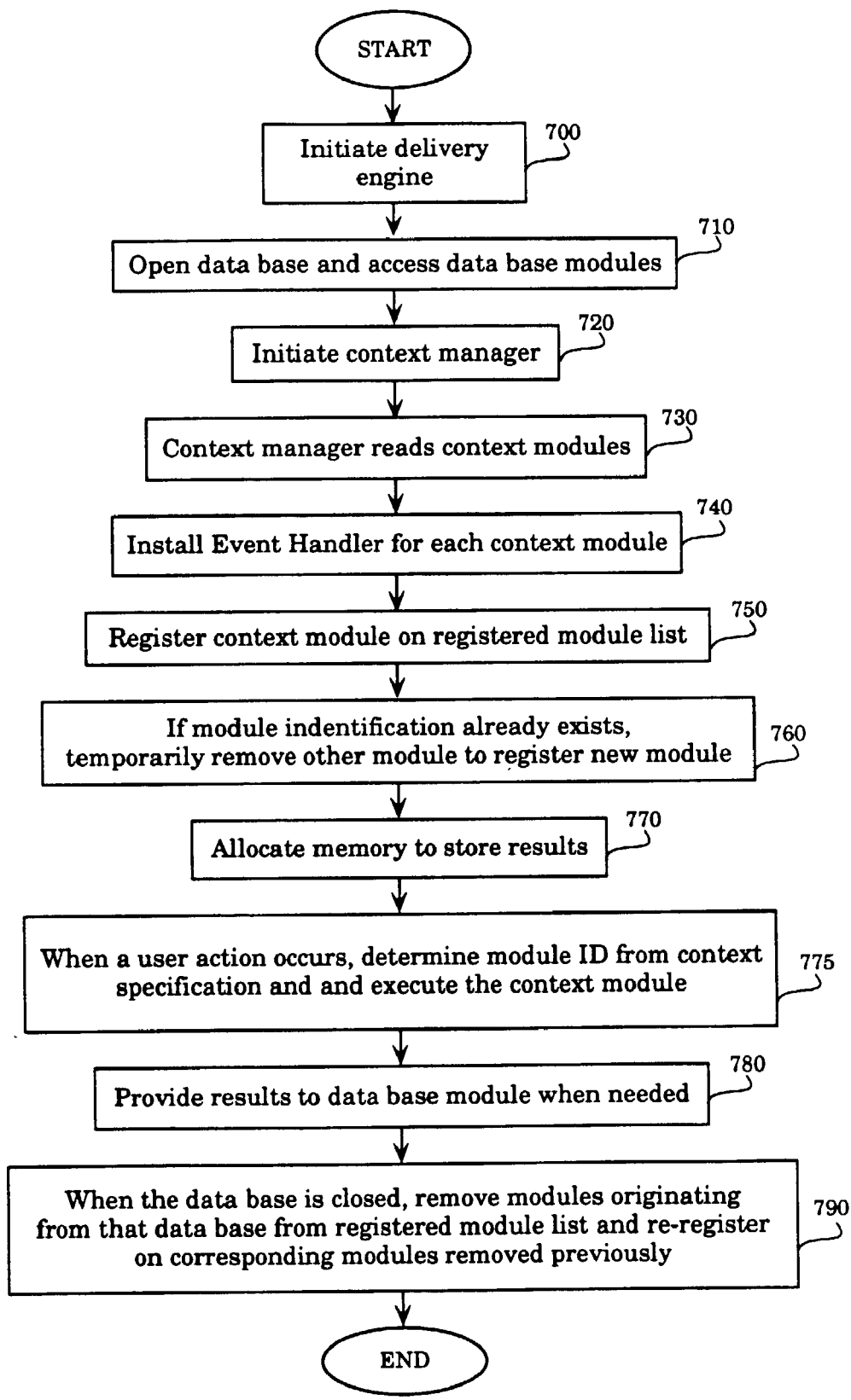
FIG. 7 is a flow diagram illustrating an alternate embodiment of the process of the present invention.

An exemplary flow diagram for this embodiment is shown in FIG. 7. At step 700, the delivery engine is initiated. At step 710, the data base is opened and the data base modules are accessed. The context manager is then initiated, step 720. At step 730, the context manager reads each context module and at step 740, an event handler is installed for each context module. Each context module is also registered on the registered module list. Memory is allocated at step 760 to store context check results. However, at step 770, prior to registering a module, the list is checked for an identically named module previously registered. The present module, by default, has priority over the prior registered module, therefore, the prior module is removed from the list the event handler is de-installed, and the present nodule is updated to identify the override of the prior module so that the present module can be installed. At step 770, memory is allocated to store the results of the context checks.

When a user action occurs, step 757, the module ID of the module to perform a context check is determined from the module specification and an event is generated to cause a context check to be performed. The results are stored in memory and, at step 780, are provided to an application or process when requested. When a data base is subsequently closed, step 790, the context modules identified to be part of the data base are removed from the registered module list and the corresponding handlers are de-installed, those modules removed previously from the registered module list, due to the duplicate named modules, are re-registered on the list and the corresponding handlers are re-installed for subsequent execution.

Alternately, when a user action occurs, the module to perform a context check is determined from the module specification, and using the module ID, the registered module list is reviewed to determine the location of the context module to that is executed to perform a context check. The context manager then calls the module to be executed. Thus, the context manager causes execution of the context module currently registered in the registered module list.

Figure 8:
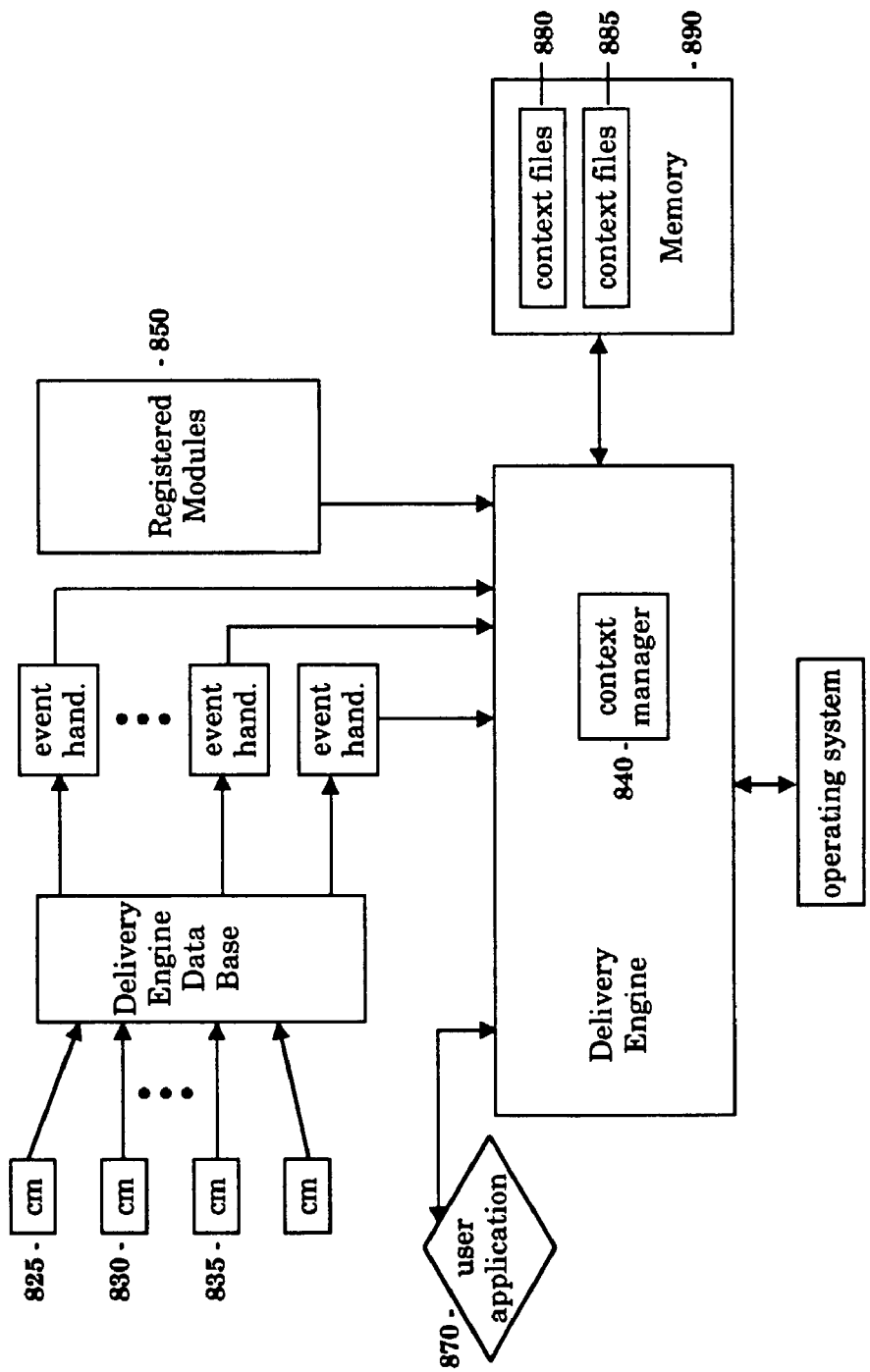
FIG. 8 is a block diagram illustrating the components in another embodiment of the present invention.

An alternate embodiment is shown in FIG. 8. In this embodiment, the registered module list 850 identifies not only the external context modules from the database that have been installed 825, 830, 835, 837, but also additional elements which perform context checks, in particular, user application 870 and context files 880, 885. These elements, 870, 880,885 are registered with the context manager by identification in the register module list 850 and are accessed by the context manager 840 as needed to perform context checks.

The context files 880, 885 are stored in memory 890 and are loaded into the context manager 840 for execution when appropriate. Preferably the context files 880, 885 are loaded into local memory and registered with the context manager when the delivery engine is initiated. The context files may be directly accessed by the context manager or accessed via a handler installed for a file. Therefore, in a multiple database environment, these modules are always present regardless of the database opened.

However, the loading of a particular context module may require the override of a context file provided at initiation of the delivery engine. The context manager can override context files or modules such that when context modules are loaded from the data base, and a context file having the same identification exists already in the registered module list, the registered file list will be updated to point to the context module from the data base. Thus, subsequently, when the particular database is closed, the context file module is restored and is once again identified on the registered module list.

Similarly, an application program can provide context information to the context manager. When an application program is initiated and is sophisticated enough to provide context information to the context manager, the application will send a message to the context manager indicating the context information it can provide. The information is then registered in the register module and called for when appropriate by the context manager. Upon receiving a request for context information, for example, via an Apple event, the application executes code to perform a context check and replies back to the context manager. Thus, the context information can come from a plurality of resources which are loaded at different times for different purposes, providing significant flexibility in implementation.

In addition, it may be found that certain context check functions are so common that the designer of the system may wish to make the context check function part of the context manager. For example, the gestault function which determines certain information regarding the system environment, such as the type of processor executing, may be installed with the context manager and therefore initiated when the context manager is initiated. In the present embodiment, this function, part of the operation of the context manager, is not included in the registered module list.

In one embodiment, a flag, referred to herein as the update flag, is preferably included to indicate that a certain data base module requires the state of a certain condition at a certain point in time. Thus, a certain context is performed once in store to acquire a "snapshot" of the context. Subsequently, when the condition requires the context information, the snapshot is supplied. This flag may be turned on and off at needed in accordance with the application. If the flag is turned off, a context check is performed each time a request for context information is made.

Figure 9:
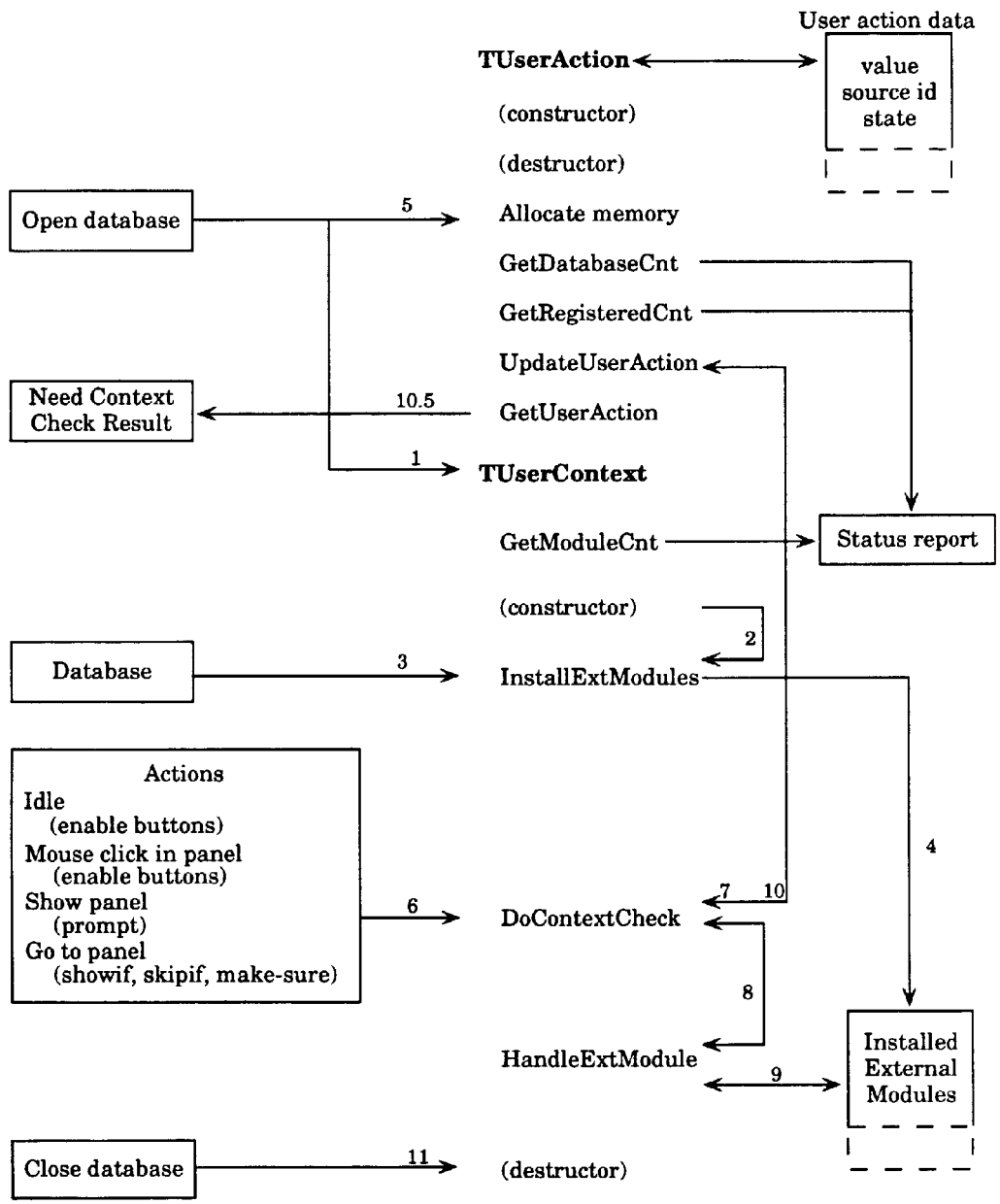
FIG. 9 is a diagram illustrating the modules and process flows employed in a preferred embodiment of the system and method of the present invention.

FIG. 9 is illustrative of the process flow and system elements employed in one preferred embodiment of the present invention. Referring to FIG. 9, TUserAction and TUserContext are two C++ modules which, when initiated, perform the functions of the context manager described herein. The components defined in each module identify steps performed to acquire information regarding the user context, the arrows and numbers associated with each arrow identifying the sequence of execution. Although FIG. 9 illustrates one preferred way for implementing the system and method of the present invention, it is readily apparent that the present invention is not limited as such and system and method can be implemented a variety of ways employing different software and hardware configurations.

The present invention has been described in conjunction with the preferred embodiment. It is evident that numerous, alternatives, modifications, variations and uses will be apparent to those skilled in the art in light of the foregoing description.

What is claimed is:

1. In a computer system comprising a processing unit executing at least one process, said computer system operating in a context, a context checking mechanism for evaluating context comprising:
   a database comprising a plurality of database modules;
   at least one context module stored in the database, said context module, when executed, performing a context check and providing a result;
   a memory for storage of the result;
   a context manager which manages the checking of context, said context manager retrieving said context module when said database is opened, said context manager controlling execution of said context module upon occurrence of a specified event, and providing the result of the context check when requested by a process.

2. The context checking mechanism as set forth in claim 1, wherein upon occurrence of the specified event a request to perform a context check is communicated to the context manager, said context check identified by a context identification.

3. The context checking mechanism as set forth in claim 2, further comprising a context specification, said context specification specifying the context identification and a name of a corresponding context module, which when executed, performs the requested context check, and wherein when said context manager receives the request to perform a context check it retrieves the name of the corresponding context module from the context specification to control execution of the corresponding context module.

4. The context checking mechanism as set forth in claim 1, further comprising a registered module list each element in the list comprising an identification of each context module and a pointer to the location of the context module.

5. The context checking mechanism as set forth in claim 4 wherein said registered module list is a linked list, each element in the list further comprising a linked list pointer pointing to the location of the next element in the list.

6. The context checking mechanism as set forth in claim 1, wherein a process executing requests the result of the context check.

7. The context checking mechanism as set forth in claim 1, wherein the specified event comprises a user action.

8. The context checking mechanism as set forth in claim 1, wherein the specified event comprises a lapse of a predetermined amount of time.

9. The context checking mechanism as set forth in claim 7, wherein said computer system further comprises at least one user data entry device, said user action comprising the entry of data by said user data entry device.

10. The context checking mechanism as set forth in claim 1, wherein the context manager allocates a portion of memory for storage of context results when the database is opened and de-allocates the portion of memory when the database is closed.

11. The context checking mechanism as set forth in claim 1, further comprising at least one context file, each context file comprising instructions, when executed, perform a context check, each context file loaded into memory during startup of the computer system.

12. The context checking mechanism as set forth in claim 4, further comprising at least one context file, each context file comprising instructions, when executed, perform a context check, each context file loaded into memory during startup of the computer system, said registered module list further comprising identification of context files loaded and a pointer to the location of the context file.

13. The context checking mechanism as set forth in claim 12, wherein if a context file is loaded having an identification of a first name and a context module has an identification of the first name, said context manager causing the context file to be unloaded when the database is opened and reloaded after the database is closed.

14. The context checking mechanism as set forth in claim 1, said context manager further comprising instructions to perform a context check.

15. The context checking mechanism as set forth in claim 4, further comprising an application process executing on the computer system, said application process comprising instructions which, when executed, perform a context check, said registered module list further comprising identification of the application process.

16. The context checking mechanism as set forth in claim 1, said context manager further loading an event handler for each context module retrieved, wherein the context module is executed by issuing an event to the event handler.

17. The context checking mechanism as set forth in claim 4, wherein said context manager controls execution of a context module by referencing the registered module list to identify the location of the context module to execute and causing code at that location of the context module to be executed.

18. The context checking mechanism as set forth in claim 17, wherein upon occurrence of the specified event a request to perform a context check is communicated to the context manager, said context check identified by a context identification;
said mechanism further comprising a context specification, said context specification specifying the context identification and a name of a corresponding context module, which when executed, performs the requested context check;
said context manager receiving the request to perform a context check and retrieving the name of the corresponding context module from the context specification to control execution of the corresponding context module.

19. In a computer system comprising a processor executing at least one process, said computer system operating in a context, a method for evaluating context comprising:
providing a database comprising at least one context module;
opening the database;
retrieving, by a context manager, the context module from the database and loading the context module for execution;
executing instructions as a process;
upon occurrence of a specified event, controlling execution of the context module, by said context manager, to perform a context check to generate a result;
providing, by said context manager, the result of the context check when requested by the process.

20. The method as set forth in claim 19, said database further comprising at least one database module comprising instructions, and said process executing instructions from the database module.

21. The method as set forth in claim 19, wherein the specified event comprises a request by the process for context information.

22. The method as set forth in claim 19, wherein the specified event comprises the occurrence of a user action and said method further comprising storing the result in memory and providing the result from memory when requested by the process.

23. The method as set forth in claim 19, further comprising generating a registered module list comprising identification of each loaded context module and a pointer to the location of the context module.

24. The method as set forth in claim 20, further comprising retrieving additional database modules for execution based upon the result of the context check.

25. The method as set forth in claim 19, further comprising generating a context specification, said context specification specifying a context identification and a name of a corresponding context module, which when executed, performs the requested context check, and wherein when said context manager receives the request to perform a context check it retrieves the name of the corresponding context module from the context specification to control execution of the corresponding context module.

26. The method as set forth in claim 25, further comprising generating a registered module list, each element in the list comprising an identification of each context module and a pointer to the location of the context module.

27. The method as set forth in claim 19, further comprising:
    providing at least one context file, each context file comprising instructions, when executed, perform a context check; and
    during startup of the computer system, loading each context file.

28. The method as set forth in claim 27, further comprising generating a registered module list comprising:
    generating an entry identifying each context file and a pointer to the location of the context file;
    generating an entry identifying each loaded context module and a pointer to the location of the context module; and
    if the identification of a context file and context module are the same,
        removing the context file from the registered module list, and
    generating an entry identifying the context file removed, wherein the context file is re-registered once the database is closed.

29. The method as set forth in claim 19, further comprising:
    executing an application process comprising context check instructions, which, when executed, perform a context check; and
    generating a registered module list comprising:
        generating an entry identifying each context file and a pointer to the location of the context file, and
        generating an entry identifying each application process requesting to be registered in the registered module list.

30. The method as set forth in claim 19, wherein loading the context module for execution comprises loading an event handler associated with the context module, controlling execution of a context module to perform a context check comprises issuing an event to the event handler associated with the context module to be executed, and providing the result comprises generating an event providing the result of the context check.

31. In a computer system comprising a processing unit executing at least one process, said computer system operating in a context, a context checking mechanism for evaluating context comprising:
    at least one context module stored in a database, said context module, when executed, performing a context check and providing a result;
    a memory for storing the result; and
    a context manager for retrieving the context module, controlling execution of the context module upon occurrence of at least one specified event, and storing the result in memory, said context module further providing the result of the context check when requested by the process.

32. The context checking mechanism as set forth in claim 31, further comprising a registered module list, each element in the list comprising an identification of each context module and a pointer to the location of the context module, wherein if a first element in the list identifies a first context module having a first identifier, and a second context module to be loaded has the first identifier, said context manager causing the first element to be removed from the list and second element to be added to the list, said second element comprising an identification of the location of the first context module.

33. The context checking mechanism as set forth in claim 31, wherein the specified event comprises a user action.

34. The context checking mechanism as set forth in claim 31, wherein the specified event comprises a lapse of a predetermined amount of time.

35. In a computer system comprising a processor executing at least one process, said computer system operating in a context, a method for evaluating context comprising:
    providing at least one context module stored in a database;
    retrieving, by a context manager, the context module;
    upon occurrence of a specified event, controlling execution of the context module, by said context manager, to perform a context check to generate a result; and
    providing, by said context manager, the result of the context check when requested by the process.

36. The method as set forth in claim 35, further comprising:
    providing a registered module list, each element in the list comprising an identification of each context module and a pointer to the location of the context module; and
    if a first element in the list identifies a first context module having a first identifier, and a second context module to be loaded has the first identifier, causing the first-element to be removed from the list and second element to be added to the list, said second element comprising an identification of the location of the first context module.

37. The method as set forth in claim 35, wherein the specified event comprises a user action.

38. The method as set forth in claim 36, wherein the specified event comprises a lapse of a predetermined amount of time.

39. A computer-readable medium having executable instructions to cause a processor to perform a method comprising:
    retrieving, by a context manager, a context module stored in a database;
    upon occurrence of a specified event, controlling execution of the context module, by said context manager, to perform a context check to generate a result; and
    providing, by said context manager, the result of the context check when requested by a process.

40. The computer-readable medium as set forth in claim 39, wherein the method further comprises:
    generating a registered module list, each element in the list comprising an identification of each context module and a pointer to the location of the context module.

41. The computer-readable medium as set forth in claim 40, wherein the method further comprises:
    if a first element in the list identifies a first context module having a first identifier and a second context module to be loaded has the first identifier, causing the first element to be removed from the list and second element to be added to the list, said second element comprising an identification of the location of the first context module.

42. The computer-readable medium as set forth in claim 40, wherein the method further comprises:
    providing at least one context file, each context file comprising instructions, when executed, perform a context check; and
    loading each context file during startup of a computer system.

43. The computer-readable medium as set forth in claim 42, wherein the method further comprises:
    generating an entry in the registered module list identifying each context file and a pointer to the location of the context file; and if the identification of a context file and context module are the same,
removing the context file from the registered module list, and
generating an entry identifying the context file removed.

44. The computer-readable medium as set forth in claim 43, wherein the method further comprises:
re-registering the context file in the registered module list when the context module is removed from the registered module list.

45. The computer-readable medium as set forth in claim 40, wherein the method further comprises:
executing an application process comprising context check instructions, which, when executed, perform a context check; and
generating an entry in the registered module list identifying of each application process requesting to be registered in the registered module list.

46. The computer-readable medium as set forth in claim 39, wherein the specified event is one of the group consisting of a user action, a lapse of a predetermined amount of time, and a request by the process for context information.

47. The computer-readable medium as set forth in claim 39, wherein upon occurrence of the specified event, a request to perform a context check identified by a context identification is communicated to the context manager.

48. The computer-readable medium as set forth in claim 47, wherein the method further comprises:
generating a context specification, said context specification specifying the context identification and a name of a corresponding context module, which when executed, performs the requested context check, and wherein said context manager retrieves the name of the corresponding context module from the context specification to control execution of the corresponding context module in response to receiving the request to perform a context check.

49. The computer-readable medium as set forth in claim 39, wherein the method further comprises:
providing the stored context module.

50. The computer-readable medium as set forth in claim 39, wherein the method further comprises:
providing a database comprising the stored context module; and
opening said database.

51. The computer-readable medium as set forth in claim 50, wherein the database further comprises at least one database module comprising instructions, and the method further comprises executing instructions from the database module as the process.

52. The computer-readable medium as set forth in claim 51, wherein the method further comprises retrieving additional database modules for execution based upon the result of the context check.

53. The computer-readable medium as set forth in claim 39, wherein the method further comprises:
executing instructions as the process.

54. The computer-readable medium as set forth in claim 39, wherein the method further comprises:
storing the result in a memory; and
providing the result from the memory when requested by the process.

55. The computer-readable medium as set forth in claim 39, wherein loading the context module for execution comprises loading an event handler associated with the context module, controlling execution of the context module comprises issuing an event to the event handler associated with the context module to be executed, and providing the result comprises generating an event providing the result of the context check.

56. An apparatus for evaluating context comprising:
means for checking context, the means for checking context to provide a result of the context check and located in a database; and
means for performing a context check upon occurrence of a specified event, the means for performing to retrieve and control the means for checking context, and provide the result when requested by a process.

57. The apparatus as set forth in claim 56, wherein upon occurrence of the specified event, a request to perform a context check identified by a context identification is communicated to the means for performing.

58. The apparatus as set forth in claim 57, further comprising:
means for specifying context, the means for specifying context comprising the context identification and a name of a corresponding means for checking context, wherein the means for controlling retrieves the name of the corresponding means for checking context in response to receiving the request to perform a context check.

59. The apparatus as set forth in claim 56, further comprising:
means for registering, the means for registering comprising elements, each element comprising an identification of a means for checking context and a pointer to the location of the means for checking context.

60. The apparatus as set forth in claim 59, wherein each element further comprises a pointer pointing to the next element in the means for registering.

61. The apparatus as set forth in claim 59, wherein if a first element identifies a first means for checking context having a first identification and a second means for checking context to be loaded has the first identification, said means for performing causes the first element to be removed from the means for registering and a second element to be added, said second element comprising an identification of the location of the first means for checking context.

62. The apparatus as set forth in claim 61, wherein when the second means for checking context is unloaded, said means for performing re-loads the first means for checking context from the location identified in the second element.

63. The apparatus as set forth in claim 59, wherein the means for performing controls the operation of a means for checking context by referencing the means for registration to identify the location of the means for checking context and causing instructions at that location to be executed.

64. The apparatus as set forth in claim 56, wherein the specified action is one of the group consisting of a user action, a lapse of a predetermined amount of time, and a request by the process for context information.

65. The apparatus as set forth in claim 56, wherein the means for performing further loads a means for handling events for each retrieved means for checking context, wherein issuing an event to a means for handling events initiates operation of the corresponding means for checking context.

66. The apparatus as set forth in claim 56, further comprising:

means for delivery, the means for delivery to retrieve and execute processes from the storage.

67. The apparatus as set forth in claim 66, wherein the means for delivery requests the result of the context check when executing a process.

68. The apparatus as set forth in claim 67, wherein the process identifies a next process to be retrieved and executed based on the result of the context check.

69. The apparatus as set forth in claim 56, wherein the means for performing loads the means for checking context when the storage is opened and further unloads the means for checking context when the storage is closed.

70. The apparatus as set forth in claim 56, wherein the means for performing allocates a portion of a memory for storing results of context checks when the storage is opened and de-allocates the portion of the memory when the storage is closed.

71. The apparatus as set forth in claim 70, wherein the means for performing stores the result of the context check in the memory and provides the result from the memory when requested by the process.

* * * * *